United States Patent [19]

Tabor et al.

[11] Patent Number: 5,066,542

[45] Date of Patent: Nov. 19, 1991

[54] RESIN BLENDS OF MALEIC ANHYDRIDE GRAFTS OF OLEFIN POLYMERS FOR EXTRUSION COATING ONTO METAL FOIL SUBSTRATES

[75] Inventors: Ricky L. Tabor; James A. Allen, both of Lake Jackson, Tex.

[73] Assignee: The Dow Chemical Company, Midland, Mich.

[21] Appl. No.: 597,630

[22] Filed: Oct. 15, 1990

Related U.S. Application Data

[63] Continuation-in-part of Ser. No. 318,049, Mar. 2, 1989, abandoned, which is a continuation of Ser. No. 836,665, Mar. 5, 1986, abandoned, which is a continuation of Ser. No. 641,087, Aug. 15, 1984, abandoned.

[51] Int. Cl.$^5$ .................. B32B 27/32; B32B 15/08; C08L 51/06; C08L 23/06
[52] U.S. Cl. .................................... 428/461; 525/74
[58] Field of Search ................... 525/74; 428/461

[56] References Cited

U.S. PATENT DOCUMENTS 4,397,916 8/1983 Nagano ........................ 428/461
4,460,632 7/1984 Adur et al. .................... 428/35

FOREIGN PATENT DOCUMENTS 2081723 2/1982 United Kingdom .
2113696 8/1983 United Kingdom .

*Primary Examiner*—Carman J. Seccuro

[57] ABSTRACT

Succinic acid or succinic anhydride grafts of HDPE are blended with LLDPE, especially ethylene/1-octene copolymers, to form blends having useful adhesive properties at elevated temperatures. The succinic acid or succinic anhydride groups are provided by grafting, respectively, maleic acid or maleic anhydride onto HDPE. The resin blends are useful for coating metal foil substrates. The adhesion of the resin blend to the metal foil substrate is particularly good at elevated temperatures (e.g., temperatures above about 60° C.).

10 Claims, No Drawings

5,066,542

RESIN BLENDS OF MALEIC ANHYDRIDE GRAFTS OF OLEFIN POLYMERS FOR EXTRUSION COATING ONTO METAL FOIL SUBSTRATES

CROSS-REFERENCE TO RELATED APPLICATIONS

This application is a continuation-in-part of pending application Ser. No. 07/318,049, filed Mar. 2, 1989, now abandoned, which is a continuation of application Ser. No. 06/836,665, filed Mar. 5, 1986, now abandoned, which is itself a continuation of application Ser. No. 06/641,087, filed Aug. 15, 1984, now abandoned.

FIELD OF THE INVENTION

Maleic acid or maleic anhydride is grafted onto high density polyethylene (HDPE), giving rise to succinic acid or succinic anhydride groups along the polymer chain. These grafted polymers are blended with ungrafted linear low density polyethylene (LLDPE) to form resin blends useful in extrusion coating onto metal foil substrates.

BACKGROUND OF THE INVENTION

Grafting of unsaturated monomer molecules onto olefin polymers and copolymers has been disclosed in a number of patents. The grafting technique has been used to impart changes in the polymer to which the grafted molecules are attached.

With respect to the invention described and claimed in this application, it is believed that the following patents are representative of the most relevant prior art on grafting of which we are aware: U.S. Pat. Nos. 2,970,129; 3,177,269; 3,270,090; 3,873,643; 3,882,194; 3,886,227; 4,087,587; 4,087,588; 4,239,830; 4,298,712; 4,394,485; 4,762,890; U.K. 2,081,723; Jap. Kokai 49(1973)-129742.

The principal distinctions between low density polyethylene (LDPE), high density polyethylene (HDPE), and linear low density polyethylene copolymer (LLDPE) are well-known to practitioners of the polyethylene art and are described, e.g., in U.S. Pat. No. 4,327,009.

There are, basically, two types of olefin polymerization techniques for preparing high molecular weight olefin polymers and copolymers. The oldest commercial technique involves high pressure, high temperature, and the use of a free radical initiator, such as a peroxide; these type polymers are generally known as low density polyethylene (LDPE) and are also known as ICI-type polyethylenes. These LDPE polymers contain branched chains of polymerized monomer units pendant from the main polymer "backbone" and generally have densities in the range of about 0.910–0.935 grams/cubic centimeter (gms/cc).

The other commercially-used technique involves coordination catalysts of the "Ziegler" type or "Phillips" type and includes variations of the Ziegler type, such as the Natta type. These catalysts may be used at very high pressures, but may also (and generally are) used at very low or intermediate pressures. The products made by these coordination catalysts are generally known as "linear" polymers because of the substantial absence of branched chains of polymerized monomer units pendant from the main polymer "backbone" and they are also generally known as high density polyethylene (HDPE). It is these "linear" polymers to which the present invention pertains. Linear high density polyethylene (HDPE) ordinarily has a density in the range of 0.941 to 0.965 gms/cc.

In some of the blends of the present invention there is used a "linear" type ethylene polymer wherein ethylene has been polymerized along with minor amounts of alpha, beta-ethylenically unsaturated alkenes having from 3 to 12 carbons per alkene molecule, preferably 4 to 8 and most preferably 8 carbons per alkene molecule (i.e., 1-octene). The amount of the alkene comonomer is generally sufficient to cause the density of the polymer to be substantially in the same density range as LDPE, due to the alkyl side chains on the polymer molecule, yet the polymer remains in the "linear" classification; they are conveniently referred to as "linear low density polyethylene" (LLDPE). These polymers retain much of the strength, crystallinity, and toughness normally found in HDPE homopolymers of ethylene, but the higher alkene comonomers impart high "cling" and "block" characteristics to extrusion-cast films and the high "slip" characteristic inherently found in HDPE is diminished.

The use of coordination-type catalysts for polymerizing ethylene into homopolymers or copolymerizing ethylene with higher alkenes to make copolymers having densities above about 0.94 gms/cc (i.e., "HDPE" polymers) and/or for copolymerizing ethylene with higher alkenes to make copolymers having densities in the range of LDPE and medium density polyethylene (i.e., "LLDPE" copolymers) is disclosed variously in, e.g., U.S. Pat. Nos. 2,699,457; 2,862,917; 2,905,645; 2,846,425; 3,058,963 and 4,076,698. Density of the polyethylene useful in the present invention is as defined in ASTM D-1248.

Many uses have been disclosed for grafted olefin polymers and copolymers. These include use of a maleic anhydride grafted olefin polymer as a blend component in the sheath of a bicomponent fiber as disclosed in U.S. Pat. No. 4,950,541.

U.S. Pat. No. 4,684,576 discloses a blend of maleic anhydride grafted HDPE with ungrafted LLDPE with the blend being in the form of a layer adhered to at least one substrate.

U.S. Pat. No. 4,452,942 discloses blends of X-methyl bicyclo(2.2.1)hept-5-ene-2,3-dicarboxylic acid anhydride (XMNA)-grafted LLDPE and HDPE with ungrafted olefins (e.g., LLDPE) that have such high adhesion to tin-free steel that the layers could not be separated. The comonomer in the LLDPE is not identified.

While these references disclose adhesion of the grafted olefin polymers at room temperature and/or at elevated temperatures, these references fail to teach or describe specifically how to consistently maintain or improve adhesion of the grafted olefin polymer at elevated temperatures. Elevated temperatures may be encountered for example in multilayer structures useful for storing and subsequently cooking foods without changing containers.

SUMMARY OF THE INVENTION

A resin blend for coating metal foil substrates for use at elevated temperatures has now been discovered. The resin blend comprises a polymer blend consisting of about 3 to about 50 percent of grafted HDPE, the remaining percentage consisting of an ungrafted LLDPE. The LLDPE is preferably an ethylene/1-octene copolymer. The resin blend has enhanced adhesion to the metal foil substrate at elevated temperatures.

DETAILED DESCRIPTIONS

The high density polyethylene polymer (HDPE) for use in the present invention is a normally solid, high molecular weight polymer prepared using a coordination-type catalyst in a process wherein ethylene is homopolymerized or wherein ethylene is copolymerized with minor amounts of higher alkenes (e.g., at least one olefinically unsaturated alkene of from $C_3$–$C_{12}$) to make copolymers having densities above about 0.94 gms/cc.

The LLDPE copolymer may have a density in the range of about 0.88 gms/cc to about 0.94 gms/cc, preferably about 0.90 gms/cc to about 0.925 gms/cc. It is evident to practitioners of the relevant arts that the density will depend, in large part, on the particular alkene(s) used as comonomer(s) and on the amount of said alkene(s) incorporated into the copolymer. The alkene(s) copolymerized with ethylene to make LLDPE comprises a minor amount of at least one olefinically unsaturated alkene of from $C_3$–$C_{12}$, most preferably from $C_4$–$C_8$; 1-octene is especially preferred. The amount of said alkene may constitute about 0.5% to about 35% by weight of the copolymer, preferably about 1% to about 20%, most preferably about 2% to about 15%.

The LLDPE copolymer may have a melt index (MI) in the range of about 0.1 grams/10 minutes (gms/10 min) to about 2000 gms/10 min as measured in accordance with ASTM D-1238(E) (190° C./2.16 kg). Preferably the melt index is in the range of about 0.1 gms/10 min to about 120 gms/10 min, most preferably about 0.1 gms/10 min to about 40 gms/10 min. Practitioners of the relevant arts are aware that the melt index is inversely related to the molecular weight of the polymer.

The HDPE which is used in making the grafted HDPE (HDPEg) in accordance with the present invention is characterized as having a melt index in the range of about 0.1 gms/10 min to about 500 gms/10 min according to ASTM D-1238(E) and a density in the range of about 0.94 gms/cc to about 0.965 gms/cc, preferably a MI of about 0.1 to about 150 gms/10 min and a density of about 0.945 to about 0.960 gms/cc. The grafted groups generally comprise about 0.0001 to about 10 wt. percent, preferably about 0.01 to about 5 wt. percent.

The ratio of grafted-HDPE/polyolefin (i.e. LLDPE) of the present blend is in the range of about 0.5/99.5 to about 99.5/0.5, preferably about 3/97 to about 50/50.

Maleic acid and maleic anhydride (MAH) compounds are known in these relevant arts as having their olefin unsaturation sites conjugated to the acid groups, in contradistinction to the fused ring and bicyclo structures of the non-conjugated unsaturated acids of, e.g., U.S. Pat. Nos. 3,873,643 and 3,882,194 and the like. Fumaric acid, like maleic acid of which it is an isomer, is also conjugated. Fumaric acid, when heated, gives off water and rearranges to form maleic anhydride, thus is operable in the present invention.

The grafting of the succinic acid or succinic anhydride groups onto ethylene polymers may be done by methods described in the art, which involve reacting maleic acid or maleic anhydride in admixture with heated polymer, generally using a peroxide or free-radical initiator to expedite the grafting.

Grafting may be effected in the presence of oxygen, air, hydroperoxides, or other free radical initiators, or in the essential absence of these materials when the mixture of monomer and polymer is maintained under high shear in the absence of heat. A convenient method for producing the graft copolymer is the use of extrusion machinery, however, Brabender mixers or Banbury mixers, roll mills and the like may also be used for forming the graft copolymers.

We prefer to employ a twin-screw devolatilizing extruder (such as a Werner & Pfleiderer twin-screw extruder) wherein maleic acid (or maleic anhydride) is mixed and reacted with the HDPE at molten temperatures, thereby producing and extruding the grafted polymer. The so-produced grafted polymer is then blended, as desired, with LLDPE to produce the blends of this invention.

U.S. Pat. No. 4,684,576, incorporated herein by reference, describes the use of blends of HDPE grafted with maleic acid or maleic anhydride to give rise to succinic acid or succinic anhydride groups along the polymer chain with other olefin polymers as an adhesive, for example, in extrusion coating of articles, as adhesive layers in films and packaging, as hot melt coatings, as wire and cable interlayers, and in other similar applications. Similar references describing adhesive blends containing HDPE grafted with unsaturated carboxylic acids, primarily for laminate structures, include U.S. Pat. Nos. 4,460,632: 4,394.485: and 4,230,830 (now reexamined U.S. Pat. No. B1 4,230,830) and U.K. Patent Application Nos. 2,081,723 and 2,113,696. All of the afore-mentioned U.S. Patents are herein incorporated by reference.

The following described methods and tests are used in testing the polymers and blends in the following examples.

The MAH-grafted HDPE homopolymers and copolymers of the present invention are useful alone in many applications wherein their adhesive properties and their strength properties offer an advantage to the user and are also useful as a blend component in improving the adhesive properties of other polymers, especially polyolefins such as LLDPE, LDPE, HDPE, polypropylene (PP), oriented polypropylene (OPP), and the like and are particularly useful as a blend component for improving the adhesive properties of ethylene/1-octene LLDPE copolymer. The polymers and blends of the present invention are useful for extrusion coating of articles, such as metals, metal foil substrates (e.g., aluminum, copper or steel), polymer films (e.g., nylon), paper, wood, or glass, and as adhesive or barrier layers in multilayer films, as adhesive layers in packaging, as laminate adhesives, as hot melt coatings or adhesives, as wire and cable interlayers, and in other applications where the thermoplasticity, the processability, the tenacity and/or the adhesiveness is utilized. The polymers and blends of the present invention are especially useful when adhered to a metal foil substrate and used at elevated temperatures, (i.e., temperatures above about 60° C.).

Adhesion Testing Procedure

Molding Specimens

Using a compression molder having two platens set at 350° F. and two platens water cooled, a 25 mil plaque of the material to be tested is molded. An appropriate amount of the adhesive thermoplastic resin blend to be tested is placed in a 25 mil mold (9" by 6") between two sheets of Mylar polyester, which, in turn, is placed between two metal plates (for support). The support plates are in good condition with no flaws which might be molded into the specimen. The support plates containing the resin and mold are placed between the 350° F. platens of the compression molder and the platens closed and allowed to heat with no pressure for one minute. After this time period, 10,000 psi pressure is applied for one minute. The support plates containing the mold and polymer are then removed and placed in the water cooled section, and the platens are raised until the middle platen of the compression molder is pushed up off of its supports. This puts a small amount of pressure on the hot polymer in the mold, and allows for proper cooling within one minute. After the one minute cooling cycle, the platens are lowered, and the mold is removed. The Mylar polyester is removed and the polymer is cut from the mold using a razor blade against a clean, hard surface.

Adhering Test Specimens to Substrate

A molding configuration is prepared as listed below, traveling from top to bottom:
(1.) Metal support plate
(2.) Mylar polyester sheet
(3.) Substrate
(4.) Mylar polyester Tab
(5.) Adhesive thermoplastic to be tested, resting inside of 9" by 6" mold.
(6.) Mylar polyester tab
(7.) Substrate
(8.) Mylar polyester sheet
(9.) Metal support plate This layered system is then placed between the 350° F. platens of the compression molder, and pressed immediately (with no melting time) to 10,000 psi for two minutes. After this time period, the hot support plates are removed from the heated platens of the molder and placed between the cooled platens of the molder. The ram is then raised until the middle platen is just raised off of its supports. Two minutes are allowed for cooling at which time when the mold configuration is removed from the molder. The Mylar polyester is removed from the samples to be tested. The above described laminate is then cut into two pieces across the Mylar polyester tab, and then into one inch strips across the tab. Five one inch specimens are pulled using an Instron testing apparatus at a rate of 2 inches per minute, after a 15 minute equilibration time at the temperature at which the samples are tested. Each data point reported is the average of five test specimens.

| LLDPE TYPE* | WEIGHT PERCENT MAH in the blend | WEIGHT PERCENT MAH-grafted HDPE* | ALUMINUM ADHESION VALUE (POUNDS/INCH) | | | | |
|---|---|---|---|---|---|---|---|
| | | | −20° C. | 20° C. | 60° C. | 100° C. | 120° C. |
| EO | .08 | 6.4 | 3.6 | 8.6 | 10.6 | 12.1 | 21.2 |
| EB | .08 | 6.4 | 5.4 | 10.0 | 14.1 | 6.9 | 6.1 |
| EO | .14 | 11.2 | 7.4 | 10.2 | 9.3 | 10.7 | 13.2 |
| EB | .14 | 11.2 | 9.8 | 12.4 | 18.1 | 4.6 | 7.6 |
| EO | .25 | 20.0 | 8.9 | 10.5 | 10.8 | 12.2 | 6.6 |
| EB | .25 | 20.0 | 9.9 | 8.2 | 17.2 | 3.2 | 5.4 |

*EO = ethylene/1-octene LLDPE copolymer having MI = 1.0, density = 0.920 g/cc
EB = ethylene/butene LLDPE copolymer having MI = 0.94, density = 0.921 g/cc
**MAH = Maleic Anhydride
***HDPE properties before grafting were MI = 10, density = 9.962 g/cc The data indicates that there is a surprising difference between the adhesion of aluminum foil substrate to an adhesive polymer blend consisting of HDPEg and ethylene/1-octene LLDPE copolymer, as opposed to the adhesion of aluminum foil substrate to a polymer blend consisting of HDPEg and ethylene/butene LLDPE copolymer, especially when tested at elevated temperatures (e.g., temperatures above about 60° C.). Elevated use temperatures above about 80° C. are especially preferred and temperatures above about 100° C. are most preferred.

What is claimed is:

1. A resin blend for coating metal foil substrates for use at elevated temperatures, said resin blend comprising a polymer blend consisting of about 3 to about 50 percent of grafted HDPE, the remaining percentage consisting of an ungrafted LLDPE, wherein the grafted HDPE is derived from a grafting reaction with maleic acid or maleic anhydride, and thus contains about 0.1 to about 5 weight percent of succinic acid or succinic anhydride groups, and wherein the HDPE, before grafting, has a melt index measured according to ASTM D-1238(E) (190° C./2.16 kg) in the range of about 0.1 grams/10 minutes to about 150 grams/10 minutes and a density in the range of about 0.94 grams/cubic centimeter to about 0.965 grams/cubic centimeter, and wherein the LLDPE copolymer is an ethylene/1-octene copolymer having a density in the range of about 0.88 grams/cubic centimeter to about 0.94 grams/cubic centimeter and a melt index measured according to ASTM D-1238(E) (190° C./2.16 kg) in the range of about 0.1 grams/10 minutes to about 40 grams/10 minutes.

2. The resin blend of claim 1 wherein said LLDPE has a density in the range of about 0.90 grams/cubic centimeter to about 0.925 grams/cubic centimeter.

3. The resin blend of claim 1 wherein said elevated temperature is above about 60° C.

4. The resin blend of claim 1 wherein said elevated temperature is above about 80° C.

5. The resin blend of claim 1 wherein said elevated temperature is above about 100° C.

6. A metal foil substrate coated with a resin blend for use at elevated temperatures comprising a polymer blend consisting of about 3 to about 50 weight percent of grafted HDPE, the remaining percentage consisting of ungrafted LLDPE, wherein the grafted HDPE is derived from a grafting reaction with maleic acid or anhydride, and thus contains about 0.1 to about 5 weight percent of succinic acid or succinic anhydride groups, and wherein the HDPE, before grafting, has a melt index measured according to ASTM D-1238(E) (190° C./2.16 kg) in the range of about 0.1 grams/10 minutes to about 150 grams/10 minutes and a density in the range of about 0.94 grams/cubic centimeter to about 0.965 grams/cubic centimeter, and wherein the LLDPE copolymer is an ethylene/1-octene copolymer having a density in the range of about 0.88 grams/cubic centimeter to about 0.94 grams/cubic centimeter and a melt index measured according to ASTM D-1238(E) (190° C./2.16 kg) in the range of about 0.1 grams/10 minutes to about 40 grams/10 minutes.

7. The metal foil substrate coated with the resin blend of claim 6 wherein said resin blend is extrusion coated onto said metal foil substrate.

8. The resin blend of claim 6 wherein said elevated temperature is above about 60° C.

9. The resin blend of claim 6 wherein said elevated temperature is above about 80° C.

10. The resin blend of claim 6 wherein said elevated temperature is above about 100° C.

* * * * *